United States Patent [19]

Paek et al.

[11] Patent Number: 4,578,098

[45] Date of Patent: Mar. 25, 1986

[54] APPARATUS FOR CONTROLLING LIGHTGUIDE FIBER TENSION DURING DRAWING

[75] Inventors: Un C. Paek, Lawrenceville; Charles M. Schroeder, Wrightstown, both of N.J.

[73] Assignee: AT&T Technologies, Inc., Berkeley Heights, N.J.

[21] Appl. No.: 621,291

[22] Filed: Jun. 15, 1984

[51] Int. Cl.$^4$ .............................................. C03B 23/04
[52] U.S. Cl. ........................................ 65/13; 65/12; 65/356
[58] Field of Search .................... 65/2, 12, 13, 356; 373/27, 113

[56] References Cited

U.S. PATENT DOCUMENTS

| | | | |
|---|---|---|---|
| 35,269 | 5/1862 | Tainter | 98/48 |
| 3,045,278 | 7/1962 | Potter | 65/13 |
| 4,030,901 | 6/1977 | Kaiser | 65/2 |
| 4,101,300 | 7/1978 | Imoto et al. | 65/2 |
| 4,383,843 | 5/1983 | Iyengar | 65/12 |
| 4,400,190 | 8/1983 | Briere | 65/12 |
| 4,407,666 | 10/1983 | Briere | 65/12 |
| 4,437,870 | 3/1984 | Miller | 65/12 |

Primary Examiner—S. Leon Bashore
Assistant Examiner—Michael K. Boyer
Attorney, Agent, or Firm—R. B. Levy; D. J. Kirk

[57] ABSTRACT

A lightguide furnace (10) includes a tube (32) at its base. The tube (32) has at least one opening (34) therethrough, in communication with, but substantially misaligned relative to, a corresponding opening (40) through a sleeve (36) coaxially aligned with, and rotatable about the tube (32). The substantial misalignment between each sleeve opening (40) and each tube opening (34) causes the cooling gas entering the furnace to be directed at least partially around the lightguide fiber (14). The cooling gas passes upwardly along the walls of the furnace away from the lightguide fiber (14) to reduce the likelihood of contamination thereof by particulates in the cooling gas. By rotating the sleeve (36) relative to the tube (32), the degree of misalignment of the sleeve openings (40) relative to the tube openings (34) can be adjusted to control the lightguide fiber cooling to regulate the tension.

1 Claim, 4 Drawing Figures

APPARATUS FOR CONTROLLING LIGHTGUIDE FIBER TENSION DURING DRAWING

TECHNICAL FIELD

This invention relates to a method and apparatus for fabricating a lightguide fiber.

BACKGROUND OF THE INVENTION

Lightguide fiber of the type used for carrying optically coded communication signals is typically fabricated by heating a portion of a lightguide preform in an inductively heated furnace and then drawing a lightguide fiber from that portion of the preform. The preform from which the fiber is drawn comprises a core surrounded by a cladding having a much lower index of refraction than the core. Typically, the furnace in which the preform is heated comprises a set of zirconia rings surrounded by granular zirconia insulation. The granular zirconia insulation is contained in a quartz beaker which is circumscribed by RF powered inductive coils. A copper shell is positioned about the quartz beaker. In operation, the preform is inserted into an opening in the top of the furnace coaxial with the zirconia rings and the fiber is heated and drawn through an opening in the bottom of the furnace which is in vertical alignment with the top opening.

To obtain lightguide fiber having acceptable transmission losses and strength characteristics, the lightguide fiber drawing tension must be carefully regulated. If the lightguide fiber tension falls below an acceptable lower limit, then transmission losses tend to increase. Further, too low a lightguide tension results in increased difficulty in obtaining precise diameter control during drawing because of the lower fiber viscosity. Too high a lightguide fiber tension can undesirably result in a low strength fiber.

The lightguide fiber tension varies with the degree of cooling within the lightguide furnace. Thus, as the lightguide fiber is cooled within the furnace, the viscosity of the drawn fiber increases which, in turn, causes an increase in the fiber tension. With present-day inductively heated lightguide furnaces, the amount of lightguide fiber cooling is generally fixed as a consequence of the relatively small openings at the top and the bottom of the furnace. The top and bottom openings are made small to restrict the entry of contaminants into the furnace. To regulate the degree of lightguide fiber cooling, the furnace temperature itself is regulated by varying the input power to the furnace. Regulation of the furnace input power requires costly and complex electrical controls.

During lightguide fiber fabrication contamination must be avoided which is the reason for restricting the size of the openings into and out of the furnace. Even very minute contaminants will significantly adversely affect lightguide fiber strength if the ocntaminants come into contact with the lightguide fiber during drawing. As an additional precaution against contaminants coming into contact with the drawn lightguide fiber and the lightguide preform, the drawn lightguide fiber and the lightguide preform may be flushed with inert gases directed against the fiber in the manner taught in U.S. Pat. No. 4,030,901 issued June 21, 1977 to Peter Kaiser and assigned to Bell Telephone Laboratories. However, the additional modifications that need to be made to the lightguide furnace to permit the lightguide preform and the lightguide fiber drawn therefrom to be flushed with inert gas increases the furnace complexity and fabrication cost. Further, the flow of inert gases along the fiber may significantly cool the fiber, which may lead to the aforementioned difficulties.

Accordingly, there is a need for a technique to regulate the cooling of the lightguide fiber during drawing to control the fiber tension while minimizing the possibility of contamination thereof.

SUMMARY OF THE INVENTION

The foregoing problems of regulating the lightguide fiber cooling during drawing to control fiber tension while avoiding contamination has been solved by the method of the present invention. A lightguide preform is heated in a lightguide furnace and fiber is drawn from the preform. A cooling gas, such as air, is directed into the furnace so that the cooling gas passes at least partially around the fiber in a direction substantially perpendicular to the axis of the fiber. The flow of cooling gas into the furnace is controlled to maintain the desired fiber tension.

DETAILED DESCRIPTION

The instant disclosure sets forth a method and control apparatus for regulating the cooling of lightguide fiber within a furnace to control fiber tension. However, such a description is for the purposes of exposition and not for limitation. For example, the control apparatus of the invention can be used in furnaces employed to heat other types of material from which fiber is drawn.

Figure 1:
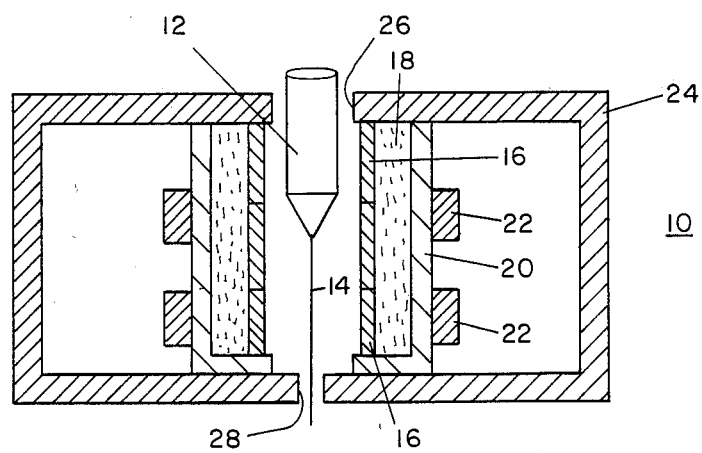
FIG. 1 is an elevational, cut-away view of a known lightguide furnace.

FIG. 1 is a front elevational view, partially cut away, of a known furnace, designated by the reference number 10, for heating a portion of a lightguide preform 12 to a temperature of approximately 2000° C. to permit a lightguide fiber 14 to be drawn from the preform 12. Motor-driven mechanisms (not shown) are usually provided to draw and collect the fiber 14 as it leaves the furnace 10.

The furnace 10 is typically comprised of a plurality of zirconia susceptor rings 16—16 surrounded by granular zirconia insulation 18 contained in a quartz beaker 20. A set of RF-powered induction coils 22—22 circumscribe the beaker 20 and heat the susceptor rings 16—16 which heat the preform 12. The beaker 20 is housed within a copper shell 24. The copper shell 24 has a top opening 26 concentric with the rings 16—16 for admitting the preform 12 and a bottom opening 28 in vertical registration with the opening 26 to allow the fiber 14 to be drawn from the furnace 10.

The drawing tension of the fiber 14 affects the fiber strength and transmission losses. One of the factors influencing drawing tension is the degree of cooling of the fiber 14 in the furnace 10. With the furnace 10 of FIG. 1, the flow of cooling gas, such as air, through the furnace 10 to avoid overheating is fixed as a consequence of the small diameter of the openings 26 and 28 at the top and bottom, respectively, of the furnace. The openings 26 and 28 are made small to reduce the likelihood of contaminants entering the furnace 10. With the cooling gas flow through the furnace 10 fixed, the lightguide cooling has been regulated, in the past, by varying the furnace temperature. Where the lightguide furnace is electrically powered, as is the case with the furnace 10, the temperature is varied by regulating the electrical input power. This requires costly and complex controls.

Another problem that may occur with the present-day furnace 10 of FIG. 1 is excessive cooling gas turbulence in the furnace which results in undesirable diameter variations in the drawn fiber 14. The cooling gas entering the furnace 10 through the bottom opening 28 directly impinges on the drawn fiber 14. If the opening 28 is made very small, as is usually the case to reduce the entry of contaminants, then the fiber 14 is exposed to a fair amount of cooling gas turbulence because the cooling gas velocity passing into the opening 28 is relatively high.

Figure 2:
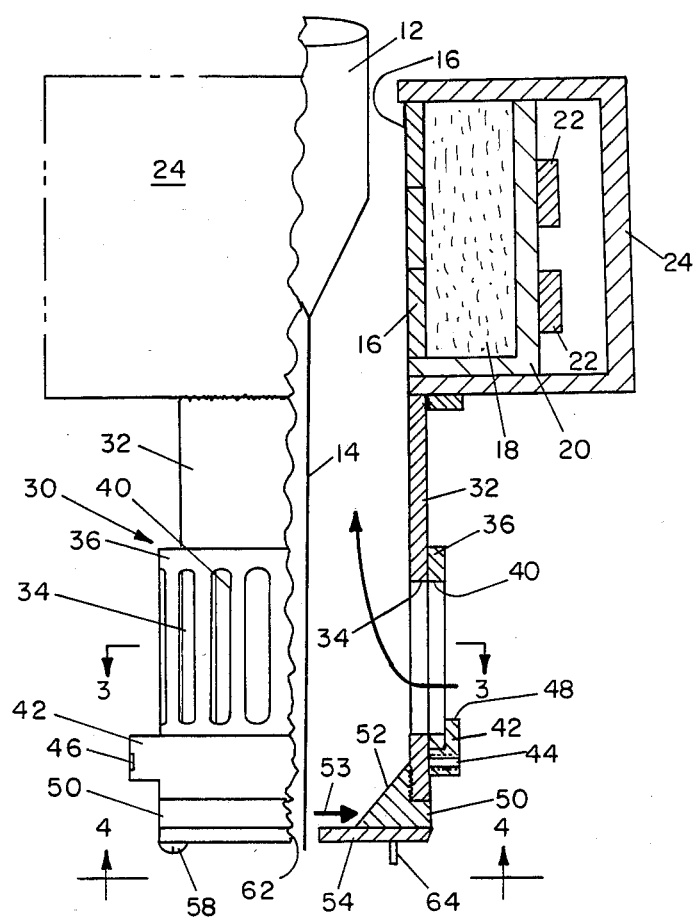
FIG. 2 is an elevational view of a lightguide furnace, partially cut away, showing the details of the apparatus of the present invention for regulating the cooling of the lightguide fiber within the lightguide furnace to control lightguide fiber tension during drawing.
Figure 3:
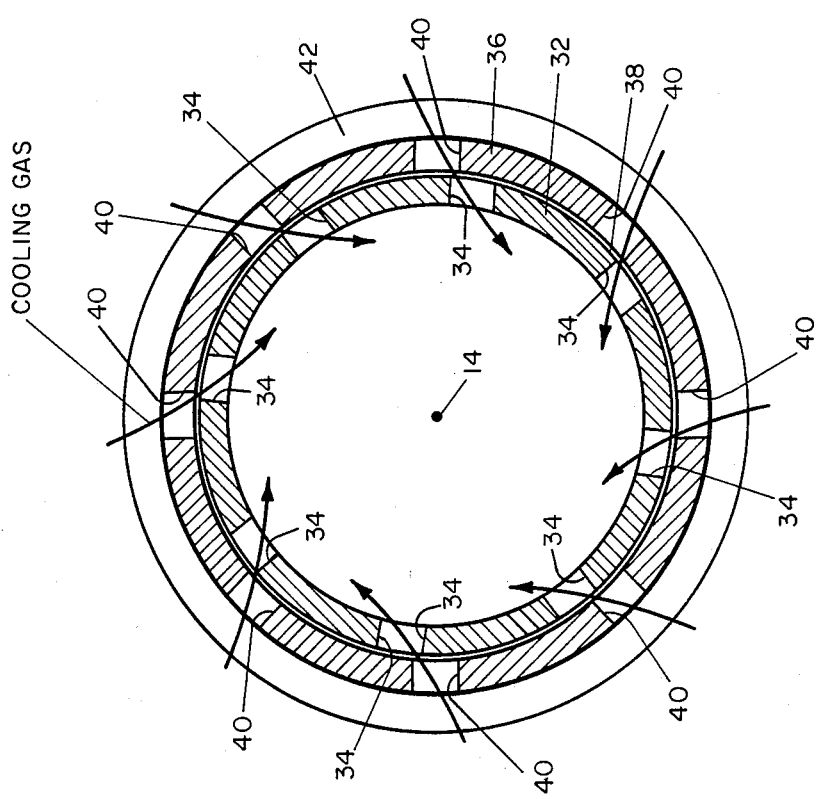
FIG. 3 is a cross-sectional view taken along the plane of lines 3—3 of FIG. 2.

To allow the degree of lightguide fiber cooling within the lightguide furnace 10 to be regulated without the need to vary the electrical power and without significant gas turbulence, a cooling control apparatus 30, best illustrated in FIG. 2, was developed. The same reference numbers have been used in FIG. 2 to reference like elements of the lightguide furnace 10 of FIG. 1. The control apparatus 30 of FIG. 2 includes a tube 32 whose upper end is threaded to engage the lower end of the lightguide furnace 10. As best illustrated in FIG. 3, the tube 32 has a plurality of openings 34 therethrough to permit a cooling gas such as air, to pass into the lightguide furnace 10 of FIG. 2. Although not clearly illustrated in either of FIGS. 2 and 3, each of the openings 34 is preferably an elongated slot, typically having rounded ends, although other geometric shapes are possible.

A sleeve 36 is coaxially aligned with the tube 32 so as to be rotatable thereabout. The outer diameter of the tube 32 is slightly smaller than the inner diameter of the sleeve 36 to create a small, but finite, gap 38 as illustrated in FIG. 3, between the sleeve 36 and the tube 32. The radial thickness of the gap 38 is typically on the order of 0.002"-0.005" and has been exaggerated in FIG. 3 for the purpose of illustration. The sleeve 36 has a plurality of openings 40—40 therethrough which are arcuately spaced apart the same as the openings 34—34 through the tube 32. In this way, the openings 34—34 in the tube 32 can be simultaneously aligned fully with the corresponding openings 40—40 in the sleeve 36 to allow for unrestricted cooling gas flow into the furnace 10. By rotating the sleeve 36 relative to the tube 32, the degree of misalignment of the sleeve openings 40—40 relative to the tube openings 34—34 can be varied to restrict the flow of cooling gas into the furnace 10. Thus, when each sleeve opening 40 is completely misaligned with each tube opening 34, cooling gas flow into the furnace 10 is substantially restricted.

Turning to FIG. 2, a collar 42 of a diameter larger than the sleeve 36 circumscribes the tube 32 between the bottom of the tube and the lower end of the openings 34. The collar 42 serves as a stop to retain the sleeve 36 on the tube 32. A pair of set screws 44 and 46 secure the collar 42 to the tube 32. At the upper edge of the collar 42 is an integral, upstanding annular flange 48 which circumscribes the lower end of the sleeve 36 to limit the sleeve 36 from moving radially relative to the tube 32.

Figure 4:
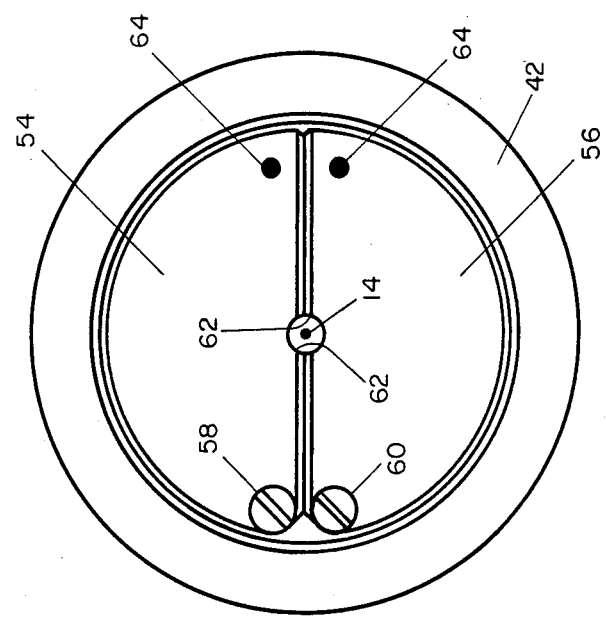
FIG. 4 is an end view of the apparatus of FIG. 1 taken along the plane of lines 4—4 of FIG. 2.

An annular ring 50 is threaded into the bottom of the tube 32. The ring 50 has an interior wall 52 which tapers inwardly from the top to the bottom of the ring 50 to form an opening 53 therethrough which is of a smaller diameter than the inside diameter of the tube 32. Referring now to FIG. 4, a pair of semi-circular shutter plates 54 and 56 are each fastened to the bottom of the ring 50 by a separate one of screws 58 and 60, respectively, so that the shutter plates 54 and 56 can rotate in opposite directions. Each of the shutter plates 54 and 56 has a semi-circular notch 62 in the edge thereof facing the other shutter plate. The notches 62—62 oppose one another to form a circular opening through which the lightguide fiber 14 of FIG. 2 passes during drawing. The shutter plates 54 and 56 each have a pin 64 which projects vertically downwardly therefrom to allow the shutter plates to be moved apart from one another.

In operation, the shutter plates 54 and 56 of FIG. 4 are typically closed to restrict the cooling gas flow into the bottom of the tube 32. Also, the sleeve 36 of FIGS. 2 and 3 is rotated relative to the tube 32 to substantially misalign the openings 40—40 with the corresponding tube openings 34—34. Even when each sleeve opening 40 is completely misaligned with a corresponding tube opening 34, some cooling gas still enters the tube 32 from the openings 40—40 in the sleeve 36 because of the radial gap 38 between the tube 32 and the sleeve 36. By substantially misaligning the sleeve openings 40—40 relative to the tube openings 34—34, the gas flow path into the tube 32 is kept extremely narrow, minimizing the likelihood of contaminants entering the tube 32.

When the openings 40—40 in the sleeve 36 are each misaligned with the corresponding openings 34—34 in the tube 32 as illustrated in FIG. 3, the cooling gas entering the tube 32, as the lightguide fiber 14 is heated, tends to flow in a substantially tangential path (as represented by the arrows) along the interior of the tube 32. The cooling gas flows around to the fiber 14 in a direction perpendicular to the axis of the fiber rather than flowing radially inwardly thereagainst. The tangential flow of cooling gas entering the tube 32 and passing around the lightguide fiber 14 enhances the natural cooling gas flow pattern in the tube 32. The cooling gas naturally travels in a generally laminar path upwardly, as illustrated in FIG. 2, along the interior surface of the tube 32 and spaced from the lightguide fiber 14 as a consequence of the chimney effect due to heating of the cooling gas in the furnace 10. The flow of the cooling gas around the lightguide fiber 14 and proximate the interior surface of the tube 32 serves to cool the lightguide fiber 14 while greatly reducing the likelihood of contact by contaminants in the cooling gas.

Typically, the sleeve 36 is initially rotated relative to the tube 32 at the outset of lightguide preform heating to substantially misalign the sleeve openings 40—40 relative to the tube openings 34—34 to establish the desired cooling gas flow into the tube 32. Once the desired amount of lightguide fiber 14 cooling is established by the degree of misalignment between each opening 40 in the sleeve 36 and the corresponding opening 34 in the tube 32, no further adjustment of the sleeve 36 is usually required.

Regulating the cooling gas flow into the furnace 10 by rotating the sleeve 36 to vary the degree of misalignment of the sleeve openings 40—40 relative to the tube openings 34—34 controls the amount of gas turbulence as well. Typically, the cooling gas opening formed by the opposing notches 62 in the shutter plates 54 and 56 of FIG. 4 is made as small as possible so as to be smaller in diameter than the diameter of the opening 26 of FIG. 2 in the top of the furnace 10. Ordinarily, the very small diameter of the cooling gas opening through the shutter plates 54 and 56, as compared to the diameter of the opening 26 in the furnace 10, would cause the cooling gas entering the opening to have a high velocity. A high cooling gas velocity would normally cause excessive gas turbulence adjacent to the fiber 14. However, by rotating the sleeve 36 relative to tube 32, the cooling gas flow into the tube 32 can be adjusted to balance the gas flow through the notches 62—62 in the shutter plates 54 and 56 and thereby reduce the gas turbulence. Further, since the cooling gas entering tube 32 through the sleeve openings 40 flows at least partially around the fiber 14 in a direction substantially perpendicular to the axis thereof, the flow of cooling gas radially against the fiber 14 is avoided, thereby reducing lightguide fiber vibration and attendant diameter variations.

In practice, the tube 32, the sleeve 36, the collar 48, the ring 52 and the shutter plates 54 and 56 are each fabricated from an inert, heat-resistant material such as stainless steel or phosphor bronze so as to resist the high heat of the lightguide furnace 10.

The cooling control apparatus 30 has been described as being attached to the furnace 10. Those skilled in the art will appreciate that the cooling control apparatus 30 could be made integral with the furnace by providing the furnace with an extension member which would take the place of the tube 32.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. Apparatus for regulating the flow of a cooling gas into a lightguide furnace to control the drawing tension of a lightguide comprising:

means for directing a cooling gas into the furnace so that the cooling gas flows at least partially around the lightguide fiber and generally upwardly along the walls of the lightguide furnace away from the lightguide fiber to cool the fiber, said means having at least one cooling gas opening therein; and a sleeve coaxially aligned with, and rotatable about, said cooling gas directing means, said sleeve having at least one cooling gas opening therethrough in communication with, but substantially misaligned relative to, said cooling gas directing means opening so that cooling gas entering said cooling gas directing means is directed substantially tangentially to the inner surface of said cooling gas directing means to cool the lightguide fiber, the amount of cooling being controlled by rotating said sleeve relative to said cooling gas directing means to vary the degree of misalignment of each said sleeve opening relative to each said cooling gas directing means opening.

* * * * *